(12) United States Patent
Onfroy

(10) Patent No.: US 6,948,368 B2
(45) Date of Patent: Sep. 27, 2005

(54) VIBRATING SENSOR WITH THERMAL SHIELD

(75) Inventor: Philippe Onfroy, Argenteuil (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 10/777,143

(22) Filed: Feb. 13, 2004

(65) Prior Publication Data

US 2004/0163473 A1 Aug. 26, 2004

(30) Foreign Application Priority Data

Feb. 24, 2003 (FR) ............................................. 03 02220

(51) Int. Cl.⁷ .......................... G01P 15/13; G01P 15/08
(52) U.S. Cl. ..................................... 73/514.21; 73/497
(58) Field of Search ........................ 73/514.21, 514.22, 73/514.23, 514.24, 497, 862.59, 514.29, 514.16

(56) References Cited

U.S. PATENT DOCUMENTS

| | | | |
|---|---|---|---|
| 3,702,073 A | * 11/1972 | Jacobs | ..................... 73/514.32 |
| 4,592,234 A | * 6/1986 | Norling | ........................ 73/497 |
| 4,912,990 A | 4/1990 | Norling | |
| 5,058,430 A | * 10/1991 | Aske | ............................ 73/497 |
| 5,188,983 A | 2/1993 | Sniegowski et al. | |
| 5,417,115 A | 5/1995 | Burns | |
| 5,458,000 A | 10/1995 | Burns et al. | |
| 5,559,358 A | 9/1996 | Burns et al. | |
| 5,600,067 A | * 2/1997 | Rupnick et al. | ......... 73/514.23 |
| 5,644,083 A | * 7/1997 | Newell et al. | ........... 73/514.29 |
| 5,962,786 A | 10/1999 | Janiaud et al. | |
| 6,161,440 A | 12/2000 | Husling et al. | |

OTHER PUBLICATIONS

Patent Abstracts of Japan, vol. 1997, No. 08, Aug. 29, 1997 & JP 09 105636 A (Murata Mfg Co Ltd), Apr. 22, 1997 *abstract.

* cited by examiner

Primary Examiner—Helen Kwok
(74) Attorney, Agent, or Firm—Young & Thompson

(57) ABSTRACT

The vibrating sensor includes a cell fixed in a housing, the cell including a support member and a vibrating member connected to the support member, together with a thermal masking element extending between the vibrating member and a wall of the housing.

16 Claims, 2 Drawing Sheets

FIG_1

VIBRATING SENSOR WITH THERMAL SHIELD

The present invention relates to a vibrating sensor, in particular an accelerometer or a gyro.

BACKGROUND OF THE INVENTION

The invention relates more particularly to sensors comprising a sensing cell in the form of a plate having defined therein a portion forming a support member and at least one vibrating element associated with excitation means. The excitation means enable the vibrating element to be set into vibration and enable the frequency of vibration thereof to be detected.

In an accelerometer, the inertial element is connected to the vibrating element. In most cases, the inertial element is a mass, which is itself defined in the plate and movable relative to the support member. When the sensor is subjected to an acceleration, the mass exerts a force on the vibrating element. This force modifies the frequency of vibration in such a manner that the variation in the frequency of vibration of the vibrating element enables the acceleration to which the sensor is subjected to be determined.

In order to avoid mechanical coupling between the vibrating element and the support member, it is general practice to provide an intermediate frame. Such mechanical isolation also lengthens the heat transfer path. This presents the advantage of ensuring that the temperature of the vibrating element is more uniform, thereby decreasing stresses of thermal origin and the associated parasitic effects. In spite of such arrangements, it has been found that variation in the frequency of vibration of the vibrating element continues to occur independently of variation in the acceleration to which the sensor is subjected, thus giving rise to parasitic variations in frequency interfering with the measurement of acceleration. So long as such parasitic variations exist they reduce the accuracy with which acceleration is measured.

OBJECT OF THE INVENTION

The present invention is based on the observation that has never been made before, whereby the temperature difference between various portions of the cell, and in particular between the vibrating member and the support member or the measurement mass results, in non-negligible manner, from an exchange of heat by radiation between the cell and the housing surrounding the cell. In particular, when the housing is at a higher temperature than the cell, the housing behaves as a source of heat which progressively raises the temperature of the cell by radiation. Those portions of the cell that have the smallest thermal inertia, and in particular the vibrating member, are thus raised to the temperature of the housing more quickly than other portions, thereby giving rise to stresses between the various portions of the cell, and thus to a variation in the frequency of vibration of the vibrating element.

On the basis of these original observations, which form part of the invention, an object of the invention is to reduce parasitic variations in frequency that result from heat exchange by radiation inside the sensor.

BRIEF SUMMARY OF THE INVENTION

The invention provides a vibrating sensor comprising a cell fixed in a housing, the cell having a support member and a vibrating member connected to the support member and powered by an excitation circuit so as to be sensitive to the movements to which the sensor is subjected, the sensor including at least one thermal masking element independent of the excitation circuit and extending between the vibrating member and at least one wall of the housing.

Thus, the thermal masking element stops at least a fraction of the heat being transmitted by radiation between the housing and the vibrating member, so that the vibrating member is protected from being heated by radiation for long enough to enable those portions of the cell that have greater thermal inertia to rise in temperature in a manner that matches substantially the rise in temperature of the vibrating member.

In a preferred embodiment of the sensor of the invention, the masking element is fixed to the housing while being spaced apart therefrom. Preferably, the masking element is connected to the housing by a link part presenting a cross-section and a length that are adapted to control heating of the masking element by conduction. This avoids the temperature of the masking element rising too quickly, since otherwise it would itself become a source of radiation relative to the cell.

BRIEF DESCRIPTION OF THE DRAWINGS

Other characteristics and advantages of the invention will appear on reading the following description of two particular, non-limiting embodiments of the invention given with reference to the accompanying figures, in which.

In the figures, the respective thicknesses of the various layers are not shown to scale so as to make the invention easier to understand.

DETAILED DESCRIPTION OF THE INVENTION

Figure 1:
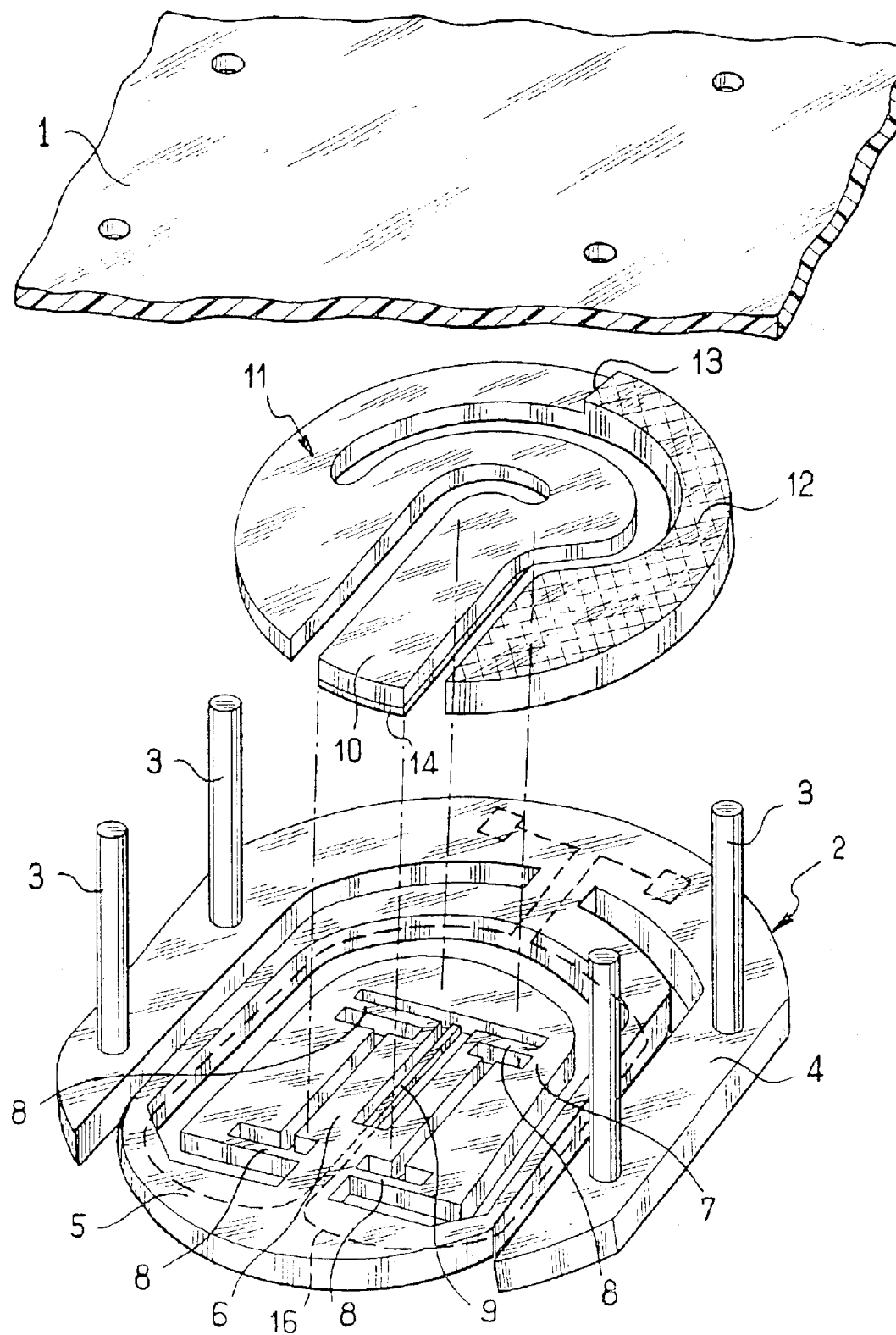
FIG. 1 is an exploded perspective view of a first embodiment of the invention.

With reference to FIG. 1, the sensor of the invention comprises, in conventional manner, a housing 1 with only a portion of its wall being shown in the figure, a cell given overall reference 2 being fixed to said portion by columns 3.

In the embodiment shown, the cell 2 comprises a U-shaped support member 4 having a decoupling frame 5 carrying masses 6 and 7 interconnected by hinges 8 directly cut out in the plate forming the cell 2. Also in conventional manner, the cell has a vibrating member 9 in the form of a bar cut out in the plate and having its ends connected respectively to the masses 6 and 7. The sensor also comprises a piezoelectric excitation circuit 16 shown in dashed lines in the figure, and a measurement circuit carried by the face of the cell opposite from the face that is visible in the figure.

According to the invention, the sensor further comprises a masking element 10 fixed to the end of a spiral-shaped link part 11 whose end opposite from the masking element 10 has a portion 12 of greater thickness defined by a shoulder 13. During assembly of the sensor, the portion 12 of greater thickness, shown cross-hatched in FIG. 1, is fixed to the inside face of the wall of the housing 1, e.g. by adhesive, so that the remainder of the link part and the masking element 10 are spaced apart from the wall of the housing 1 by a distance that is equal to the height of the shoulder 13.

In the embodiment shown, the masking element 10 is substantially rectangular in shape and covers not only the vibrating element 9, but also an adjacent portion of the cell as indicated by chain-dotted lines in FIG. 1. In addition, the link part which surrounds the masking element 10 also extends over a portion of the cell adjacent to the vibrating member 9.

When the temperature of the housing 1 is higher than that of the cell 2, the wall of the housing behaves as a source of heat, and heat is thus transferred between the wall of the housing 1 and the cell 2 not only by conduction via the columns 3, but also by radiation. The masking element 10 which is interposed between the wall of the housing 1 and the cell 2, thus protects the vibrating member 9 against radiation so long as the temperature of the masking element 10 is no greater than that of the vibrating member 9. In this context, it should be observed that the masking element 10 heats up progressively, not only under the effect of heat being transferred by radiation between the wall of the housing 1 and the masking element 10, but also under the effect of heat being transferred by conduction due to the portion 12 of greater thickness being in contact with the wall of the housing 1. This transfer of heat by conduction takes place via the link part 11.

According to an aspect of the invention, the link part 11 is made of an appropriate material, and presents a cross-section and a length that are adapted to control heating of the masking element 10 by conduction so that the temperature rise of the masking element 10 is itself matched to the temperature rise of the remainder of the cell so that the temperature rise of the cell as a whole is more or less uniform under the effect of the various transfers of heat to which the cell is subjected.

The thickness of the masking element is also determined as a function of the respective shapes of the masking element 10, of the link part 11, and of the cell 2. By way of non-limiting example, for a cell having the configuration shown in FIG. 1, and made out of a quartz crystal plate having a thickness of 500 micrometers ($\mu$m), a shield as shown in FIG. 1 has been made out of glass with a thickness of 100 $\mu$m.

It should be observed that in the opposite case where the housing is at a temperature lower than that of the cell 2, exchange of heat by radiation reverses directions, with the wall of the housing then acting as a heat sink. In this case, the masking element acts as above to minimize transfers of heat by radiation.

The effectiveness of the shield can be improved by a reflective coating 14 on the face of the masking element 10 which faces the vibrating member 9. This reflective coating can be made by vacuum depositing a thin layer of gold on the masking element 10, and where necessary on part or all of the link part 11.

Figure 2:
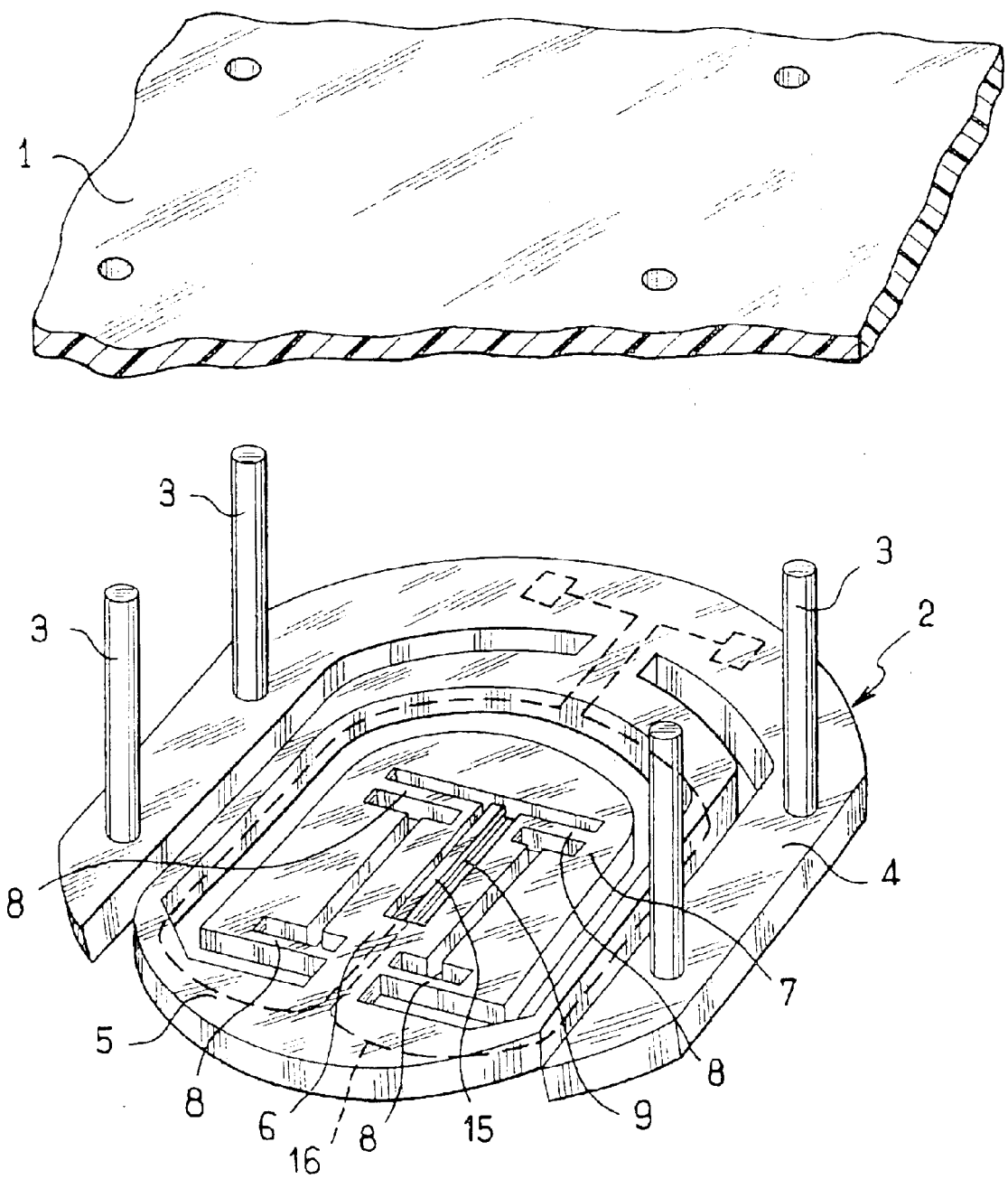
FIG. 2 is a view analogous to FIG. 1, showing a second embodiment of the invention.

FIG. 2 shows a second embodiment of the invention in which the masking element 10 fixed to the housing is replaced by a masking element formed by a reflective layer 15 covering the vibrating member 9. As above, the reflective layer 15 may also cover an adjacent part of the cell, for example the masses 6 and 7 and also the hinges 8. This embodiment of the masking element presents the advantage of being isolated from any transfer of heat by conduction.

Naturally, the invention is not limited to the embodiments described and variants that can be applied thereto will appear to the person skilled in the art without going beyond the ambit of the invention as defined by the claims.

In particular, although the shield in the first embodiment is shown as being fixed to the housing 1, the shield could equally well be fixed to the cell. In which case, it is nevertheless appropriate to ensure that the shield is spaced apart from the vibrating member sufficiently to avoid interfering with the mechanical operation of the vibrating member. The masking element may also be carried by the cell, by being made integrally with the cell during manufacture thereof.

Although the invention is described in the context of embodiments in which there is a masking element on one side only of the cell, masking elements can be provided on both sides of the cell so as to protect the vibrating element 9 against radiation coming from the facing walls of the housing 1. Nevertheless, it should be observed that the electrodes which extend over one of the faces of the cell are generally made in the form of a reflective layer of gold, so the face of the cell carrying the electrodes has a smaller requirement for protection against heat transfer by radiation than does the opposite face.

When manufacturing the masking element(s), and where appropriate the link parts carrying them, dimensions should be determined as a function of the thermal budget that results from the structure of the cell and the configuration of the housing relative to the cell. Although the spacing between the wall of the housing and the masking element 10 in the embodiment of FIG. 1 is shown as being obtained by a portion of greater thickness of the link part, this spacing may be obtained by means of a spacer, or merely by the thickness of the layer of adhesive that is used for fixing the link part to the wall of the housing.

Although the invention is described in the context of a suspended-mass accelerometer, the invention is applicable to any vibrating sensor in which the vibrating element runs the risk of being subjected to differential stresses relative to the support member because of non-uniform transfers of heat over the various portions of the sensor. In particular, the invention is applicable to a star gyro, in particular a gyro as defined in patent document FR-A-2 741 151.

The invention applies regardless of the structure of the cell, including when the cell does not have an intermediate frame.

What is claimed is:

1. A vibrating sensor comprising a cell fixed in a housing, the cell having a support member and a vibrating member connected to the support member and powered by an excitation circuit so as to be sensitive to the movements to which the sensor is subjected, the sensor including at least one thermal masking element independent of the excitation circuit and extending between the vibrating member and at least one wall of the housing so that said at least one thermal masking element only partly covers a surface of the cell facing said at least one wall of the housing.

2. A vibrating sensor according to claim 1, wherein the masking element is fixed to the housing while being spaced apart therefrom and spaced apart from the cell.

3. A vibrating sensor according to claim 2, wherein the masking element is carried by a link part.

4. A vibrating sensor according to claim 3, wherein the link part includes a portion of greater thickness.

5. A vibrating sensor according to claim 3, wherein the link part is made of a suitable material and presents a cross-section and a length that are adapted to control heating of the masking element by conduction.

6. A vibrating sensor according to claim 3, wherein the link part extends facing a portion of the cell adjacent to the vibrating member.

7. A vibrating sensor according to claim 2, wherein a face of the masking element facing towards the vibrating member carries a reflective layer.

8. A vibrating sensor according to claim 1, wherein the masking element is carried by the cell.

9. A vibrating sensor according to claim 1, wherein the masking element comprises a reflective layer applied to the vibrating element.

10. A vibrating sensor according to claim 9, wherein the reflective layer also extends over a portion of the cell adjacent to the vibrating member.

11. A vibrating sensor comprising a cell fixed in a housing, the cell having a support member and a vibrating member connected to the support member and powered by an excitation circuit so as to be sensitive to the movements to which the sensor is subjected, the sensor including at least one thermal masking element independent of the excitation circuit and extending between the vibrating member and at least one wall of the housing, wherein the masking element is carried by a link part.

12. A vibrating sensor according to claim 11, wherein the link part includes a portion of greater thickness.

13. A vibrating sensor according to claim 11, wherein the link part is made of a suitable material and presents a cross-section and a length that are adapted to control heating of the masking element by conduction.

14. A vibrating sensor according to claim 11, wherein the link part extends facing a portion of the cell adjacent to the vibrating member.

15. A vibrating sensor comprising:
a housing;
a cell fixed in the housing, the cell having a support member and a vibrating member connected to the support member and powered by an excitation circuit so as to be sensitive to movements to which the sensor is subjected, the vibrating member having a thermal mass smaller than a thermal mass of remaining portions of the cell;
a thermal masking element, independent of the excitation circuit, extending between the vibrating member and at least one wall of the housing to minimize parasitic stresses in the cell, wherein,
said thermal masking element only partly covers a surface of the cell facing said at least one wall of the housing to locally thermally isolate the vibrating member, and
said thermal masking element stops heat being transmitted by radiation between the housing and the vibrating member so that the vibrating member and the remaining portions of the cell rise in temperature in a substantially matched manner whereby said thermal masking element minimizes parasitic stresses in the cell.

16. A vibrating sensor according to claim 15, wherein the masking element is fixed to the housing while being spaced apart therefrom and spaced apart from the cell.

* * * * *